United States Patent [19]

Amano et al.

[11] Patent Number: 5,478,900
[45] Date of Patent: Dec. 26, 1995

[54] PROCESS FOR PREPARING VINYL CHLORIDE POLYMER OF QUALITY

[75] Inventors: Tadashi Amano; Tadayoshi Hiyama, both of Ibaraki, Japan

[73] Assignee: Shin-Etsu Chemical Co., Ltd., Tokyo, Japan

[21] Appl. No.: 234,664

[22] Filed: Apr. 28, 1994

[30] Foreign Application Priority Data

May 7, 1993 [JP] Japan .................. 5-131274

[51] Int. Cl.⁶ .................................................. C08F 2/20
[52] U.S. Cl. .................................. 526/88; 526/202
[58] Field of Search ............................ 526/88, 202

[56] References Cited

U.S. PATENT DOCUMENTS

| | | | |
|---|---|---|---|
| 3,682,877 | 8/1972 | Czekay | 526/88 |
| 3,929,753 | 12/1975 | Itoh et al. | |
| 4,143,224 | 3/1979 | Klippert et al. | |
| 4,324,878 | 4/1982 | Biaggi | 526/200 |
| 4,456,735 | 6/1984 | Engelmann | 526/202 |
| 5,292,836 | 3/1994 | Kitamura | 526/88 |

FOREIGN PATENT DOCUMENTS

| | | |
|---|---|---|
| 2085047 | 12/1971 | France. |
| 2207149 | 6/1974 | France. |
| 2381071 | 9/1979 | France. |

*Primary Examiner*—Christopher Henderson
*Attorney, Agent, or Firm*—McAulay Fisher Nissen Goldberg & Kiel

[57] ABSTRACT

Vinyl chloride polymer is prepared by suspension polymerization of monomeric vinyl chloride or a mixture of vinyl chloride and another monomer in an aqueous medium while agitating the suspension. A first partially saponified polyvinyl alcohol having a degree of saponification of 60–80 mol % and an average degree of polymerization of 500–1,000 is added as a suspension stabilizer at the start of polymerization, and a second partially saponified polyvinyl alcohol having a degree of saponification of 75–85 mol % and an average degree of polymerization of 1,500–2,700 is added while the conversion is 30% to 60%. The agitating power is controlled to 80–120 kg·m/s·ton from the start of polymerization to a conversion of 20 to 50%, and to 130–200 kg·m/s·ton from then to the completion of polymerization. The resulting vinyl chloride polymer is of quality as demonstrated by a high bulk density and improved free flow, monomer removal, gelation, and plasticizer absorption as well as minimal fish eye. Scale build-up on the reactor wall is minimized.

10 Claims, No Drawings

PROCESS FOR PREPARING VINYL CHLORIDE POLYMER OF QUALITY

BACKGROUND OF THE INVENTION

1. Field of the Invention

This invention relates to a process for preparing a vinyl chloride polymer of quality.

2. Prior Art

Vinyl chloride polymers are useful resins having excellent physical properties and find widespread application whether they are rigid or flexible.

Vinyl chloride polymers are generally molded by calendering, extrusion molding and injection molding techniques. In an advanced rigid extrusion molding technique, it is desired to increase the throughput of a molding machine. It is then desired to have a vinyl chloride polymer having a high bulk density.

In preparing vinyl chloride polymers by suspension polymerization in aqueous media, many attempts were made to produce vinyl chloride polymers having a higher bulk density, for example, by feeding an addition monomer during polymerization as disclosed in Japanese Patent Application Kokai (JP-A) No. 16800/1984, using highly saponified polyvinyl alcohol as disclosed in JP-A 7600/1982, and feeding an additional suspending agent during polymerization as disclosed in JP-A 39309/1993.

Although these processes are successful in producing polymers having a high bulk density, the polymers are less porous, leaving the problems that molded parts have many fish eyes and gelation is difficult. The low porosity also hinders monomer removal, which means that the polymer grains have a high concentration of residual unreacted monomer to adversely affect the working environment associated with polymer preparation or molding and working processes. There is a possibility that the unreacted monomer be left in molded parts, and the presence of residual monomer is detrimental in a particular application associated with food or the like.

On the other hand, improvements were made in polyvinyl alcohol as the suspending agent. There were developed oil-soluble polyvinyl alcohols having a low degree of polymerization and a low degree of saponification and modified polyvinyl alcohols having various modifying groups introduced therein. Among them, the oil-soluble polyvinyl alcohols are effective for improving monomer removal and fish eye control, but result in a lowering of bulk density and deteriorated free flow due to electrostatic charging. The modified polyvinyl alcohols fail to keep suspension systems stable with conventional techniques, leaving the problems of scale build-up and substantial particle size variation.

JP-A 311708/1992 or U.S. Pat. No. 5,342,906 proposes a dispersion polymerization method by which a vinyl chloride polymer having comparatively high bulk density, low monomer removal, good plasticizer absorption and minimized fish eyes was obtained with minimizing scale build-up in a reactor. However, the bulk density of the resulting polymer is not so fully improved from the standpoint of an extruder output in extrusion molding. Therefore, there is a demand for vinyl chloride polymers having a higher bulk density.

SUMMARY OF THE INVENTION

Therefore, an object of the present invention is to provide a process for preparing a vinyl chloride polymer of quality which has a high bulk density and is improved in free flow, monomer removal, gelation, plasticizer absorption and fish eye while minimizing scale build-up in the reactor.

Regarding a process for preparing a vinyl chloride polymer by suspension polymerization of monomeric vinyl chloride or a vinyl monomer mixture containing vinyl chloride as a major component in an aqueous medium while agitating the suspension, the inventors made investigations on the type and addition stage of suspension stabilizer, agitating conditions and other factors. We have found that when a partially saponified polyvinyl alcohol having a degree of saponification of 60 to 80 mol %, an average degree of polymerization of 500 to 1,000, a viscosity of up to 15 centipoise as measured in 4% aqueous solution at 20° C., and a light absorbance of at least 4 as measured in 1% aqueous solution at a wavelength of 280 nm is added to the suspension as a suspension stabilizer at the start of polymerization, another partially saponified polyvinyl alcohol having a degree of saponification of 75 to 85 mol % and an average degree of polymerization of 1,500 to 2,700 is added to the suspension at an intermediate stage of polymerization, and additionally, appropriate agitating conditions are selected in accordance with a degree of polymerization, more specifically, the agitating power is controlled to 80 to 120 kg·m/s·ton in an early duration from before the start of polymerization to a conversion of 20 to 50% and to 130 to 200 kg·m/s·ton in a later duration from the end of the early duration to the completion of polymerization; there is obtained a vinyl chloride polymer of quality which has a high bulk density and is improved in free flow, monomer removal, gelation, plasticizer absorption and fish eye while minimizing scale build-up in the polymerization kettle.

The suspension stabilizer used at the initial stage of polymerization is a partially saponified polyvinyl alcohol having intense emulsifying/dispersing action. If a greater agitating power is given at the initial stage of polymerization in a system using such a suspension stabilizer having enhanced emulsifying/dispersing action, the monomer liquid is dispersed into too fine droplets so that the suspension system becomes unstable, giving rise to the problem that the polymer forms coarse grains and much scale deposits on the reactor wall. Therefore, the agitating power should be controlled relatively low at the initial stage of polymerization. In a later stage, a highly saponified polyvinyl alcohol is added for increasing the bulk density of polymer particles, and the agitating power is increased for thereby depriving the polymer grains of microparticulates adhering to their surface. Then a vinyl chloride polymer of quality can be produced without depositing scale on the reactor wall.

Accordingly, the present invention provides a process for preparing a vinyl chloride polymer by suspension polymerization of a monomeric charge containing vinyl chloride in an aqueous medium while agitating the polymerizing suspension. The monomeric charge consists of monomeric vinyl chloride or is a mixture of monomeric vinyl chloride and at least one vinyl monomer copolymerizable therewith. (A) A first partially saponified polyvinyl alcohol is added to the suspension as a suspension stabilizer at the start of polymerization. The first saponified polyvinyl alcohol has a degree of saponification of 60 to 80 mol %, an average degree of polymerization of 500 to 1,000, a viscosity of up to 15 centipoise as measured in 4% aqueous solution at 20° C., and a light absorbance of at least 4 as measured in 1% aqueous solution at a wavelength of 280 nm. (B) A second partially saponified polyvinyl alcohol is added to the suspension in an amount of 0.001 to 0.5% by weight based on the monomeric charge while the conversion is 30% to 60%. The second saponified polyvinyl alcohol having a degree of saponification of 75 to 85 mol % and an average degree of polymerization of 1,500 to 2,700. (C) In a duration from before the start of polymerization to a conversion of 20 to 50%, the agitating power is 80 to 120 kg·m/s·ton. (D) In a duration from thereafter to the completion of polymerization, the agitating power is 130 to 200 kg·m/s·ton.

DETAILED DESCRIPTION OF THE INVENTION

The present invention is concerned with a batch process for preparing a vinyl chloride polymer by suspension polymerization of a monomeric charge containing vinyl chloride in an aqueous medium while mechanically agitating the suspension.

The monomeric charge may consist of monomeric vinyl chloride. Alternatively the monomeric charge is a mixture of monomeric vinyl chloride and at least one vinyl monomer copolymerizable therewith. The mixture preferably contains more than 50% by weight, preferably more than 80% by weight of monomeric vinyl chloride. Examples of the comonomer used herein include vinyl esters such as vinyl acetate and vinyl propionate; acrylates and methacrylates such as methyl (meth)acrylate and ethyl (meth)acrylate; olefins such as ethylene and propylene; vinyl ethers such as lauryl vinyl ether and isobutyl vinyl ether; and other monomers copolymerizable with vinyl chloride such as maleic anhydride, acrylonitrile, styrene, and vinylidene chloride. One or more of these comonomers may be used in combination with vinyl chloride.

To the monomeric charge is added a polymerization initiator, which may be selected from conventional ones used for the suspension polymerization of prior art vinyl chloride systems. Exemplary polymerization initiators which can be used herein include percarbonates such as diisopropylperoxydicarbonate (IPP), di-2-ethylhexylperoxydicarbonate, and diethoxyethylperoxydicarbonate; peresters such as t-butylperoxyneodecanate, t-butylperoxypivalate, t-hexylperoxypivalate, α-cumyl-peroxyneodecanate, and 2,4,4-trimethylpentyl-2-peroxy-2-neodecanate; peroxides such as acetylcyclohexylsulfonylperoxide, 2,4,4-trimethylpentyl-2-peroxyphenoxyacetate, 3,5,5-trimethylhexanoylperoxide and lauroyl peroxide (LPO); azo compounds such as azobis-2,4-dimethylvaleronitrile and azobis (4-methoxy-2,4-dimethylvaleronitrile) alone or in admixture of two or more. Preferred polymerization initiators are percarbonates and peresters.

Preferably the polymerization initiator is added to the reaction system in an amount of about 0.03 to about 0.2 parts by weight per 100 parts by weight of the monomeric charge. After a reactor is loaded with the monomeric charge, the initiator may be added to the reaction system by diluting it with a suitable solvent or forming an aqueous emulsion and pumping the dilution or emulsion to the reaction system under pressure.

In the practice of the invention, polymerization conditions other than those specified in the invention, such as charging method, charging proportion and polymerization temperature may be in accord with conventional ones. Preferably the weight ratio of water to monomer is from 0.9:1 to 1.5:1, more preferably from 1.0:1 to 1.25:1 at the initial charging. Additional water may be added during polymerization if desired. To reduce the heating time and stabilize the suspension system, use of deionized water at a temperature of 40° to 50° C. is preferred. If the weight ratio of water to monomer is less than 0.9, the suspension stability of the reaction system is lowered, resulting in a broader particle distribution of the resulting polymer, the formation of coarse particles, and much scale build-up in the reactor. On the other hand, if the weight ratio of water to monomer is more than 1.5, a bulk density of the resulting polymer is not so fully improved.

The suspension stabilizer used at the start of polymerization and forward is a first partially saponified polyvinyl alcohol having a degree of saponification of 60 to 80 mol %, an average degree of polymerization of 500 to 1,000, a viscosity of up to 15 centipoises as measured in 4% aqueous solution at 20° C., and an absorbance of at least 4 as measured in 1% aqueous solution at a wavelength of 280 nm. More preferably, the first partially saponified polyvinyl alcohol has a degree of saponification of 65 to 75 mol %, an average degree of polymerization of 700 to 1,000, a viscosity of 4 to 8 centipoises as measured in 4% aqueous solution at 20° C. and an absorbance of 4.5 to 7.5 as measured in 1% aqueous solution at a wavelength of 280 nm. Use of a partially saponified polyvinyl alcohol which does not satisfy one or more of these requirements brings no increase of bulk density and increases fish eyes, failing to attain the objects of the invention. Preferably the first partially saponified polyvinyl alcohol is added in an amount of about 0.02 to about 0.08% by weight of the monomeric charge. It may be introduced into the reactor by dispersing or dissolving in a suitable solvent such as water.

After the reactor is charged with a vinyl monomer, suspension stabilizer and other ingredients, agitation is started to uniformly disperse the contents. In the practice of the invention, the agitating power is set in the range of 80 to 120 kg·m/s·ton, preferably 90 to 110 kg·m/s·ton. This initial agitating power is maintained until a conversion of 20 to 50%, preferably 30 to 40% is reached. With an initial agitating power outside the range, the resulting polymer has a low bulk density, scale builds up on the reactor wall, and coarse grains form.

Thereafter, the agitator is accelerated to increase the agitating power to 130 to 200 kg·m/s·ton, preferably 130 to 180 kg·m/s·ton. This later agitating power is maintained until the completion of polymerization. If the later agitating power is lower than 130 kg·m/s·ton, the resulting polymer has a low bulk density and a low plasticizer absorption and contains a large amount of unreacted monomers. Further, heat removal near the end of polymerization becomes difficult and when a reflux condenser is connected to the kettle, there arises an undesirable phenomenon that the polymer is carried over into the condenser. If the later agitating power exceeds 200 kg·m/s·ton, polymer grains are reduced in size and thus less free flowing.

In addition, while the conversion is from 30 to 60%, preferably from 40 to 50%, a second partially saponified polyvinyl alcohol is added to the suspension in an amount of about 0.001 to about 0.5% by weight, preferably 0.001 to 0.2% by weight, more preferably 0.001 to 0.1% by weight based on the monomeric charge for increasing bulk density. The second saponified polyvinyl alcohol has a degree of saponification of 75 to 85 mol % and an average degree of polymerization of 1,500 to 2,700, and preferably has a degree of saponification of 80 to 85 mol % and an average degree of polymerization of 2,000 to 2,700. If the second polyvinyl alcohol is prematurely added before a conversion of 30% is reached, polymer grains are reduced in size and bulk density and thus less free flowing. If it is added after a conversion of 60% is over, bulk density is no longer increased. A partially saponified polyvinyl alcohol having a degree of saponification of less than 75 mol % and an average degree of polymerization of less than 1,500 is not effective for increasing bulk density whereas a partially saponified polyvinyl alcohol having a degree of saponification of more than 85 mol % and an average degree of polymerization of more than 2,700 is less effective for increasing bulk density and introduces many fish eyes. Less than 0.001% by weight of the second polyvinyl alcohol is not effective for its purpose while more than 0.5% by weight of the second polyvinyl alcohol gives no further benefits and is thus economically undesired.

Since the agitating power is selected in accordance with a conversion according to the present invention, the structures of the reactor and agitator are important. The reactor is preferably a cylindrical kettle having a height to diameter ratio of from 1.5:1 to 2.5:1. The preferred agitator includes multiple stages of paddles, faudlers, propellers, and turbine blades, all combined with buffles.

In the process of the invention, any of ingredients commonly used in vinyl chloride systems for polymerization, for example, polymerization control agents, chain transfer agents, pH adjusting agents, gelation enhancers, antistatic agents, crosslinking agents, stabilizers, fillers, antioxidants, buffer agents, and anti-scaling agents may be added at an appropriate stage.

EXAMPLE

Examples of the present invention are given below by way of illustration and not by way of limitation.

Examples 1–2 and Comparative Examples 1–5

A stainless steel polymerization kettle with an interior volume of 2.1 m$^3$ equipped with an agitator and a jacket was charged with 845 kg of deionized water at 45° C. and the suspension stabilizer shown in Table 1 in the amount shown in Table 1 and then evacuated until a vacuum of 50 mmHg was reached. Then the kettle was charged with 760 kg of monomeric vinyl chloride. While agitating the contents under the conditions shown in Table 1, hot water was passed through the jacket to start heating of the contents. At the same time, 420 g of di-2-ethylhexylperoxydicarbonate was admitted into the kettle under pressure to start polymerization.

Then polymerization reaction was continued while keeping the suspension at a temperature of 57° C. on the way of polymerization, the suspending agent shown in Table 1 was added and the agitation conditions were changed as shown in Table 1.

At the time when the pressure within the kettle reached 6.0 kg/cm$^2$G, the unreacted monomer was recovered and the polymer in slurry form was taken out of the kettle and dried. There was obtained a vinyl chloride polymer.

Comparative Example 6

A stainless steel polymerization kettle with an interior volume of 2.1 m$^3$ equipped with an agitator and a jacket was charged with 845 kg of deionized water at 45° C. and the suspension stabilizer shown in Table 1 in the amount shown in Table 1 and then evacuated until a vacuum of 50 mmHg was reached. Then the kettle was charged with 760 kg of monomeric vinyl chloride. While agitating the contents under an agitating power of 120 kg·m/s·ton, hot water was passed through the jacket to start heating of the contents. At the same time, 420 g of di-2-ethylhexylperoxydicarbonate was admitted into the kettle under pressure to start polymerization.

Then polymerization reaction was continued while keeping the suspension at a temperature of 57° C. On the way of polymerization, the agitating power was changed to 110 kg·m/s·ton at the conversion of 10%, 100 kg·m/s·ton at the conversion of 20% and 140 kg·m/s·ton at the conversion of 60% as shown in Table 1.

At the time when the pressure within the kettle reached 6.0 kg/cm$^2$G, the unreacted monomer was recovered and the polymer in slurry form was taken out of the kettle and dried. There was obtained a vinyl chloride polymer.

The vinyl chloride polymer was measured for bulk density, particle size distribution, DOP absorption, fish eye, residual monomer, and gelation by the following methods. The kettle interior was visually observed for scale build-up. The results are also shown in Table 1.

Bulk Density

It was measured according to JIS K-6721.

Particle Size Distribution

It was measured according to JIS Z-8801. The particles were sifted through #60, #100 and #200 screens and the passages were determined in by weight.

DOP Absorption

An aluminum alloy container having an inner diameter of 25 mm and a depth of 85 mm was packed with fiber glass on the bottom. The vinyl chloride polymer, 10 grams, was weighed and admitted into the container. Dioctyl phthalate (DOP), 15 cc, was added to the resin which was allowed to stand for 30 minutes, allowing the DOP to fully penetrate into the resin. Thereafter, excess DOP was centrifuged under an acceleration of 1500G. The amount of DOP absorbed in the resin was determined and expressed in parts by weight per 100 parts by weight of the resin.

Fish Eye

A mixture of 100 parts of the vinyl chloride polymer, 50 parts of DOP, 0.1 parts of barium stearate, 0.1 parts of cadmium stearate, 0.8 parts of cetyl alcohol, 2.0 parts of a tin stabilizer, 0.5 parts of titanium dioxide, and 0.1 parts of carbon black, all in parts by weight, was milled on a 6-inch roll mill at 140° C. for 5 minutes to form a sheet of 0.3 mm thick. The number of white transparent particles in a 100 cm$^2$ area of the sheet was counted.

Residual Monomer

After a certain amount of the vinyl chloride polymer was dissolved in tetrahydrofuran, the monomer content in the polymer was quantitatively determined by gas chromatography. The amount of residual monomer is expressed in ppm based on the weight of dry polymer.

Gelation

In a Henschel mixer, 100 parts of the vinyl chloride polymer was blended with 0.5 parts of tribasic lead sulfate, 2.5 parts of lead stearate, and 0.7 parts of barium stearate, all in parts by weight. The mixture, 67 grams, was admitted into a Brabender Plasti-Corder® and milled at 210° C. and 40 rpm. The gelation time was the time taken until a maximum torque was reached.

Scale Build-Up in the Polymerization Kettle

After the slurry was taken out of the kettle, the scale build-up on the interior wall was visually inspected and rated according to the following criterion.

⊚: metal surface maintained mirror finish luster without scale deposit
○: cloudy mirror finish metal surface
X: filmy scale over the entire metal surface

TABLE 1

| | | Example | | Comparative Example | | | |
|---|---|---|---|---|---|---|---|
| | | 1 | 2 | 1 | 2 | 3 | 4 |
| Suspension stabilizer | | | | | | | |
| type | A | 0.04% at initial | 0.04% at initial | 0.04% at initial | 0.04% at initial | 0.04% at initial | — |
| amount time | B | 0.02% at conversion = 40% | 0.05% at conversion = 50% | — | — | 0.02% at conversion = 40% | 0.07% at initial |
| | C | — | — | — | — | — | 0.02% before start |
| Agitating conditions | | up to conversion = 40%, 100 kg · m/s · ton (200 rpm) thereafter 130 kg · m/s · ton (215 rpm) | up to conversion = 30%, 90 kg · m/s · ton (190 rpm) thereafter 170 kg · m/s · ton (230 rpm) | from start to end 100 kg · m/s · ton (200 rpm) | up to conversion = 40%, 100 kg · m/s · ton (200 rpm) thereafter 130 kg · m/s · ton (215 rpm) | from start to end 100 kg · m/s · ton (200 rpm) | from start to end 100 kg · m/s · ton (200 rpm) |
| Test | | | | | | | |
| Bulk density | | 0.585 | 0.583 | 0.545 | 0.537 | 0.567 | 0.550 |
| Particle | #60 pass | 100 | 100 | 100 | 100 | 100 | 99.5 |
| size | #100 pass | 25.3 | 21.1 | 23.4 | 30.1 | 21.3 | 31.2 |
| distribution | #200 pass | 0.0 | 0.0 | 0.0 | 0.2 | 0.0 | 0.7 |
| DOP absorption | | 21.3 | 22.1 | 22.4 | 22.5 | 20.5 | 19.0 |
| Fish eyes | | 0 | 0 | 1 | 1 | 3 | 40 |
| Residual monomer | | 0.1> | 0.1> | 0.2 | 0.1 | 0.3 | 2.5 |
| Gelation | | 4.5 | 4.3 | 5.1 | 5.0 | 5.2 | 6.9 |
| Scale buildup | | ⊚ | ⊚ | O~X | O~X | O | O |

| | Comparative Example 5 | | Comparative Example 6 |
|---|---|---|---|
| Suspension stabilizer | | Suspension stabilizer | |
| type D | 0.04% at initial | type A | 0.04% at initial |
| amount B | 0.02% | amount | |
| time | at conversion = 40% | time | |
| Agitating conditions | up to conversion = 40%, 100 kg · m/s · ton (200 rpm) thereafter 130 kg · m/s · ton (215 rpm) | Agitating conditions | up to conversion = 10%, 120 kg · m/s · ton conversion = 10% to conversion = 20% 110 kg · m/s · ton conversion = 20% to conversion = 60% 100 kg · m/s · ton thereafter 140 kg · m/s · ton |
| Test | | Test | |
| Bulk density | 0.502 | Bulk density | 0.558 |
| Particle #60 pass | 89.3 | Particle #60 pass | 98.5 |
| size #100 pass | 11.3 | size #100 pass | 39.4 |
| distribution #200 pass | 0.0 | distribution #200 pass | 0.5 |
| DOP absorption | 22.8 | DOP absorption | 23.9 |
| Fish eyes | 5 | Fish eyes | 3 |
| Residual monomer | 0.2 | Residual monomer | 0.3 |
| Gelation | 5.9 | Gelation | 5.2 |
| Scale buildup | X | Scale buildup | X |

Suspension Stabilizer A

Partially saponified polyvinyl alcohol having a degree of saponification of 72.4 mol %, an average degree of polymerization of 770, a viscosity of 5.7 centipoise as measured in 4% aqueous solution at 20° C., and an absorbance of 6.5 as measured in 1% aqueous solution at wavelength 280 nm.

Suspension Stabilizer B

Partially saponified polyvinyl alcohol having a degree of saponification of 80.2 mol % and an average degree of polymerization of 2,600.

Suspension Stabilizer C

Hydroxypropylmethyl cellulose having a methoxy substitution of 29.2% by weight, a hydroxypropoxy substitution of 8.9% by weight, and a viscosity of 49.5 centipoise as measured in 2% aqueous solution at 20° C.

Suspension Stabilizer D

Partially saponified polyvinyl alcohol having a degree of saponification of 72.4 mol %, an average degree of polymerization of 770, a viscosity of 5.7 centipoise as measured in 4% aqueous solution at 20° C. and an absorbance of 3.2 as measured in 1% aqueous solution at wavelength 280 nm.

As seen from Table 1, the process of the present invention can produce vinyl chloride polymers having a high bulk density, a low microparticulate content, few fish eyes, and minimized residual monomer while minimizing the scale deposition to the kettle wall. In contrast, if no suspension stabilizer was added during polymerization, the resulting polymer had a low bulk density although the agitating conditions were within the scope of the invention (Comparative Example 2). If the agitating conditions were kept unchanged from the start to the end, the resulting polymer had many fish eyes and contained more residual monomer although the suspension stabilizer was added during polymerization according to the invention (Comparative Example 3). Outside the polymerizing conditions of the present invention, much scale deposited on the kettle wall.

Next, the vinyl chloride polymers obtained in Example 1 and Comparative Example 6 were tested about an extruder output in the following manner.

| Formulation | |
|---|---|
| | parts by weight |
| Vinyl chloride polymer | 100 |
| Lead stabilizer | 2.5 |
| Barium stearate | 0.5 |
| Stearic acid | 0.3 |
| Polyethylene wax | 0.3 |

The above components were charged in a 10 liter-Henschel mixer in the above amounts to mix and agitate them. When the temperature of the mixture reached to 120° C., cooling water was flowed in a jacket attached to the Henschel mixer to cool the mixture in the mixer. There was obtained a rigid polyvinyl chloride compound for extrusion molding.

By using a 20 mm diameter extruder, a rod having a size of 5 mm×10 mm was extruded from the compound in the following conditions to evaluate the extruder output of the compound. The results were shown below.

Extrusion Conditions

| | |
|---|---|
| Screw: | CR = 3.0, L/D = 20, Rotary speed = 30 rpm |
| Cylinder temperature | $C_1$ = 160° C. |
| | $C_2$ = 180° C. |
| | $C_3$ = 170° C. |
| Die temperature | D = 180° C. |

Extruder Output

Vinyl chloride polymer of Example 1: 43 g/min.

Vinyl chloride polymer of Comparative Example 6: 39 g/min.

There has been described a process for preparing a vinyl chloride polymer by adding appropriate suspension stabilizers at appropriate stages and controlling the agitation power in early and later durations. The resulting vinyl chloride polymer is of quality in that it has a high bulk density, is improved in free flow, monomer removal, gelation, and plasticizer absorption, and presents few fish eyes. The polymer is obtained without substantial scale build-up on the reactor wall.

Japanese Patent Application No. 5-131274 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A process for preparing a vinyl chloride polymer by suspension polymerization of a monomeric charge containing vinyl chloride in an aqueous medium while agitating the suspension, wherein (A) the weight ratio of water to monomer is from 0.9:1 to 1.5:1;

(B) a first partially saponified polyvinyl alcohol in an amount of 0.02 to 0.08% by weight based on the monomeric charge is added to the suspension as a suspension stabilizer at the start of polymerization, said first saponified polyvinyl alcohol having a degree of saponification of 65 to 75 mol %, an average degree of polymerization of 700 to 1,000, a viscosity of 4 to 8 centipoise as measured in 4% aqueous solution at 0° C., and a light absorbance of 4.5 to 7.5 as measured in 1% aqueous solution at a wavelength of 280 nm;

(C) a second partially saponified polyvinyl alcohol is added to the suspension in an amount of 0.001 to 0.5% by weight based on the monomeric charge while the conversion is 30% to 60%, said second saponified polyvinyl alcohol having a degree of saponification of 75 to 85 mol % and an average degree of polymerization of 1,500 to 2,700;

(D) from before the start of polymerization to a conversion of 30 to 40%, the agitating power is 80 to 120 kg·m/s·ton, and (E) from thereafter to the completion of polymerization, the agitating power is 130 to 200 kg·m/s·ton.

2. The process of claim 1 wherein said monomeric charge consists of a vinyl chloride monomer.

3. The process of claim 1 wherein said monomeric charge is a mixture of a vinyl chloride monomer and at least one vinyl monomer.

4. The process of claim 1 wherein the agitation power is set in the range of 90 to 110 kg·m/s·ton.

5. The process of claim 1 wherein the agitator is accelerated to increase the agitating power to 130 to 180 kg·m/s·ton.

6. The process of claim 1 wherein while the conversion is from 40 to 50%, a second partially saponified polyvinyl alcohol is added.

7. The process of claim 1 wherein the second partially saponified polyvinyl alcohol is added in an amount of 0.001 to 0.2% by weight.

8. The process of claim 1 wherein the second partially saponified polyvinyl alcohol is added in an amount of 0.001 to 0.1% by weight.

9. The process of claim 1 wherein the second partially saponified polyvinyl alcohol has a degree of saponification of 80 to 85 mol % and an average degree of polymerization of 2000 to 2700.

10. The process of claim 1 wherein the weight ratio of water to monomer is from 1.0:1 to 1.25:1.

* * * * *